US011276967B2

(12) United States Patent
 Kropiewnicki

(10) Patent No.: US 11,276,967 B2
(45) Date of Patent: Mar. 15, 2022

(54) DEVICE AND METHOD FOR THE LOAD-FREE DISCONNECTION OF A PLUG-IN CONNECTION

(71) Applicant: HARTING ELECTRIC GMBH & CO. KG, Espelkamp (DE)

(72) Inventor: Norbert Kropiewnicki, Bielefeld (DE)

(73) Assignee: HARTING ELECTRIC GMBH & CO. KG

( * ) Notice: Subject to any disclaimer, the term of this patent is extended or adjusted under 35 U.S.C. 154(b) by 0 days.

(21) Appl. No.: 16/981,521

(22) PCT Filed: Apr. 8, 2019

(86) PCT No.: PCT/DE2019/100320
§ 371 (c)(1),
(2) Date: Sep. 16, 2020

(87) PCT Pub. No.: WO2019/201383
PCT Pub. Date: Oct. 24, 2019

(65) Prior Publication Data
US 2021/0119389 A1  Apr. 22, 2021

(30) Foreign Application Priority Data

Apr. 20, 2018 (DE) .................... 10 2018 109 530.9

(51) Int. Cl.
 *H01R 13/703* (2006.01)
 *H01R 13/629* (2006.01)
 (Continued)

(52) U.S. Cl.
 CPC ... *H01R 13/7038* (2013.01); *H01R 13/62955* (2013.01); *H01R 43/26* (2013.01); *H02J 3/0012* (2020.01); *H02J 4/00* (2013.01)

(58) Field of Classification Search
 CPC ............. H01R 13/641; H01R 13/7038; H01R 13/62955; H01R 43/26; H02J 4/00; H02J 3/0012
 (Continued)

(56) References Cited

U.S. PATENT DOCUMENTS 5,435,748 A * 7/1995 Abe ..................... H01R 13/641
                                                             439/188
5,478,250 A * 12/1995 Hoffman ............... B60L 53/305
                                                             439/142
(Continued)

FOREIGN PATENT DOCUMENTS

DE         295 13 997      12/1995    ........... H01R 13/639
DE      10 2006 016 137    10/2007    ........... H01R 13/703
(Continued)

OTHER PUBLICATIONS

German Office Action issued in German Appln. Serial No. 10 2018 309 530.9, datad Mar. 20, 2019, with machine English translation, 13 pages.
(Continued)

*Primary Examiner* — Gary F Paumen
(74) *Attorney, Agent, or Firm* — Hayes Soloway P.C.

(57) ABSTRACT

Disclosed a device for the load-free disconnection of a plug-in connection, which has an electrical disconnecting device and a locking clip. The locking clip can be pivoted both into a position locking the plug-in connection and into a position unlocking the plug-in connection. The device also has a sensor system, which interacts with the locking clip in its locking position to detect the locked state, in order to control the electrical disconnecting device.

14 Claims, 1 Drawing Sheet

(51) Int. Cl.
*H01R 43/26* (2006.01)
*H02J 4/00* (2006.01)
*H02J 3/00* (2006.01)

(58) Field of Classification Search
USPC ........................................................ 439/489
See application file for complete search history.

(56) References Cited

U.S. PATENT DOCUMENTS

| | | | | | |
|---|---|---|---|---|---|
| 5,481,204 | A | * | 1/1996 | Aikawa | ................. G01R 31/69 |
| | | | | | 324/754.14 |
| 6,982,393 | B2 | * | 1/2006 | Matsui | ............. H01R 13/62933 |
| | | | | | 200/335 |
| 7,854,623 | B2 | * | 12/2010 | Radenne | ................ H01R 43/26 |
| | | | | | 439/489 |
| 8,092,249 | B2 | * | 1/2012 | German | ................ H04Q 1/136 |
| | | | | | 439/489 |
| 8,264,366 | B2 | * | 9/2012 | Chamarti | ............... G01D 21/00 |
| | | | | | 340/686.4 |
| 9,130,286 | B2 | | 9/2015 | Schloegl | ............. H01R 13/005 |
| 9,478,900 | B1 | | 10/2016 | Juds et al. | ............. H01R 13/53 |
| 9,748,693 | B1 | * | 8/2017 | Exenberger | .......... H01R 13/465 |
| 10,483,748 | B2 | | 11/2019 | Witt et al. | .............. H02H 3/021 |
| 2002/0173186 | A1 | | 11/2002 | Tsuchiya | ....................... 439/157 |
| 2005/0014407 | A1 | | 1/2005 | Saur et al. | ..................... 439/187 |
| 2005/0098419 | A1 | | 5/2005 | Matsui et al. | ................ 200/311 |
| 2015/0111408 | A1 | * | 4/2015 | Sasaki | ..................... B60L 53/65 |
| | | | | | 439/357 |
| 2017/0229813 | A1 | * | 8/2017 | Exenberger | ...... H01R 13/62977 |

FOREIGN PATENT DOCUMENTS

| | | | | |
|---|---|---|---|---|
| DE | 10 2009 042 568 | | 3/2011 | ............. F16L 25/01 |
| DE | 10 2015 105 370 | | 10/2016 | ................ H02J 3/00 |
| DE | 20 2016 106 664 | | 1/2017 | ........... H01R 13/641 |

OTHER PUBLICATIONS

International Search Report and Written Opinion issued in PCT/DE2019/100320, dated Jul. 18, 2019, with English translation, 17 pages.
International Preliminary Report on Patentability issued in PCT/DE2019/100320, dated Oct. 20, 2020, 7 pages.

* cited by examiner

DEVICE AND METHOD FOR THE LOAD-FREE DISCONNECTION OF A PLUG-IN CONNECTION

BACKGROUND OF THE INVENTION

The invention is based on a device for the load-free disconnection of a plug-in connection.

The invention is further based on a method for the load-free disconnection of a plug-in connection.

Devices and methods of this type are required for the load-free disconnection of a plug-in connection, i.e. they are required in order to reliably prevent the plug-in connection from being disconnected under load.

The expression "disconnection under load" means the following:

Until the time of disconnection, a load current flows through at least one contact pair. The contact pair consists of two contacts, namely a contact which usually belongs to a plug connector and a mating contact which usually belongs to a mating plug connector. These two contacts are connected to one another in a mechanically and electrically conductive manner until the time of disconnection, so that the load current can flow through the contact pair until the disconnection. In this case, the plug connector and the mating plug connector are usually plugged together, i.e. the plug-in connection is closed.

From the time of disconnection, a load voltage in the form of a corresponding electrical potential difference is applied between the contact and the mating contact. As a result, flashovers and/or sparks can occur during the disconnection process which damage the contact material on the surface of the contacts or at least weaken the conductivity thereof.

The phrase " . . . load-free disconnection . . . " therefore means that a disconnection under load is prevented, i.e. that the disconnection process takes place without such a load current flowing through the respective contact pair until the time of the disconnection process. This ultimately prevents the possibility of flashovers, sparks, damage, etc. occurring as a result when disconnecting.

The load voltage, which is applied between the contact and the mating contact in the disconnected state, usually corresponds to a so-called "supply voltage" which is usually applied to the at least one contact of the mating plug connector. The term "supply voltage" in this case and hereinafter describes an electrical voltage which is provided together with a corresponding supply current for transmitting electrical energy in operation. In contrast to a comparatively low signal voltage, the supply voltage is at least 60 V ("volts"), in particular at least 100 V, preferably at least 120 V, for example at least 200 V, e.g. at least 220 V, for example at least 230 V, in particular at least 350 V, e.g. 380 V, but can also lie in the high voltage range and then can be at least 1000 V (1 kV), in particular at least 2 kV, for example at least 4 kV, i.e. at least 6 kV, for example, and preferably 8 kV or even 10 kV and more, for example for operating electrical industrial facilities, railways or also in power plants, etc.

BRIEF DESCRIPTION OF THE PRIOR ART

In the prior art, a connection box and a network for energy distribution is known from printed document DE 10 2015 105 370 A1, for example. In this case, an electronic switch is connected upstream of a galvanic isolator, for example a relay, in order to prevent the galvanic isolator from being disconnected under load. In the case of an emergency disconnection, which also takes place if the electronic switch is closed owing to a higher priority which is assigned to it, a counter is incremented in the connection box. This makes it possible for the disconnections under load—which are to be prevented in principle—to be optionally at least counted. The galvanic isolator, which wears as a result of disconnections of this type, can be replaced after a certain number of these disconnections.

One disadvantage of this prior art is that complex electronics and data technology is necessary, which is generally too expensive for simple plug-in connections. Furthermore, this does make it possible to switch off in a safe manner. However, this does not disclose the manner in which the switch-off process is initiated. A disconnection under load is also not prevented in each case but instead—if priority is given—is carried out and counted despite the load.

Printed document DE 10 2006 016 137 A1 discloses a plug-in device for contacting the high-voltage assembly of a hybrid vehicle. The plug-in device possesses a housing, a control contact provided inside the housing and a high-voltage contact provided inside the housing, which high-voltage contact is longer than the control contact. Furthermore, the printed document discloses a control device which detects a disconnection of the control contact from an associated mating contact when the plug-in device is released and initiates switching off the high-voltage at the high-voltage connection point when a disconnection is detected.

A disadvantage of this prior art is that the system requires a control voltage at the plug-in side at a specific contact. Compatibility with other plug-in systems, namely at least the assignment of the contacts, is therefore limited. In particular, the contact which transmits the control voltage is firmly assigned in the plug-in system and is therefore not available to be used freely.

Printed document DE 10 2009 042 568 A1 discloses a plug-in coupling system for transmitting high power electrical energy as well as for transmitting a pressurized fluid. The plug-in coupling system consists of at least one coupling plug and at least one coupling socket with at least one electrical conductor. The coupling plug can be inserted into the coupling socket to form a coupled state and can furthermore be removed from the coupling socket to form a decoupled state. The plug-in coupling system possesses at least one electromechanical protection system, consisting of at least one electronic switching means and at least one mechanical switching means arranged inside the coupling socket and/or the coupling plug for establishing or disconnecting the electrically conductive connection. The electronic switching means and the mechanical switching means can be controlled independently of one another. Furthermore, it is disclosed that the at least one electronic switching means can be formed by a relay or by an electronic circuit which has an electronic high-power component, preferably a high-power transistor. In a further aspect, the locking clip is lockable by a locking bolt of a solenoid. In a further configuration, the at least one mechanical switching means can be switchable for establishing or disconnecting the electrically conductive connection by inserting the coupling plug into the coupling socket or by removing the coupling plug from the coupling socket.

However, in principle it has been shown with respect to the latter configuration that mechanically switching the electrical and/or mechanical switching means via disconnecting plug connectors and mating plug connectors does not always effectively protect against electrical flashovers and the like, due to the mechanical inertia of the mechanical components involved, for example when the plug-in connection is disconnected very quickly, i.e. the plug connector, which is under load, is pulled abruptly.

Printed document DE 295 13 997 U1 discloses an electrical monitoring device for the locked position of at least one locking clip, comprising a sensor element and an excitation element which close a switching element in the case of mutual approximation in the locked position of the locking clip. In particular, provision is made for the sensor element to be arranged in one of the two housings for controlling an electrical switching element, for an excitation element to be arranged in each case in the at least one locking clip for the sensor element, for the sensor element and the excitation element in each case to be arranged spatially relative to one another and to be coordinated in sensor terms in such a way that the transmitter element acts on the sensor element in the locked position of the respective locking clip in such a way that it generates a control signal for the electrical switching element, and for the transmitter element to act ineffectively on the sensor element outside the locked position of the respective locking clip in such a way that it does not generate a control signal for the electrical switching element.

A disadvantage in this prior art is that the locking clip can trigger the sensor even in the unplugged state and the load current is switched to the plug contacts. This causes premature wear to the switches and can possibly also lead to the risk of manual contact with live contacts.

In the priority application relating to the following application, the German Patent and Trademark Office has researched the following prior art: DE 20 2016 106 664 U1 and DE 295 13 997 U1.

OBJECT OF THE INVENTION

The object of the invention involves specifying a device and a method which guarantee a load-free disconnection of a plug-in connection in a particularly reliable manner.

SUMMARY OF THE INVENTION

A device for the load-free disconnection of a plug-in connection has at least one electrical disconnection device and one locking device. The locking device can assume a position locking the plug-in connection and also in a position unlocking the plug-in connection. Furthermore, the device possesses a sensor, in particular as a component of a sensor system, which cooperates with the locking device, in order to control the electrical disconnection device.

The locking device is a locking clip which can be pivoted into said locked position and also into said unlocked position.

In other words, the device therefore has at least the electrical disconnection device and the locking clip for the load-free disconnection of a plug-in connection, wherein the locking clip can be pivoted into a position locking the plug-in connection, i.e. closed, and also into a position unlocking the plug-in connection, i.e. open. Furthermore, the device includes the sensor, in particular the sensor system, which cooperates with the locking clip, in particular in the locked position thereof for detecting the locked position of the plug-in connection, in order to control the electrical disconnection device.

Furthermore, the device has a plug-in detector for determining a plug-in state of the plug-in connection. The plug-in detector and the locking sensor can be configured to control the electrical disconnection device together.

The device is particularly advantageous, since, on the one hand, it prevents electrical voltage being applied at the plug connector in the unplugged state, which includes protection against contact, for example. On the other hand, it also prevents an electric arc/a flashover or the like from occurring as a result of pulling the plug out of the mating plug too quickly despite previously switching off. One single plug-in detector or one single locking sensor could not solve these two aspects of the problem. However, the locking sensor effectively guarantees that a sufficiently long period of time passes between switching off the load current and pulling out the plug, since a certain time passes naturally between unlocking and pulling out the plug. Furthermore, the plug-in detector prevents the locking clip from unintentionally actuating the locking sensor in the unplugged state and therefore an electrical voltage being applied to the open plug connector. Moreover, a double protection against applying an undesired electrical load voltage/supply voltage to the plug contacts in the unplugged state is provided.

In this case and hereinafter, the locking sensor is also described verbally in a simplified manner as a sensor and the plug-in detector is sometimes also simply described as a detector. The plug connector is also sometimes described as a plug.

In one advantageous configuration, the electrical disconnection device possesses a control unit and an actuator unit. The plug-in detector and also the locking sensor are connected to the outside of the control unit. In particular, the control unit can possess a logical evaluation unit, in particular with a boolean, i.e. logical "AND" link of the signals of the detector and the sensor, which is used, to either link together the plug-in signal of the plug-in detector when the plug connector is plugged in and the locking signal of the locking detector when the locking clip is locked, in order to thus cause the actuator unit to transmit a load current, or to cause the actuator unit to block the load current when the plug connector is not plugged in and/or the locking clip is not closed.

For example, the plug-in detector can have a switch or a magnetic field sensor or a so-called radio frequency identification device ("RFID") or a contact bridge in the insulating body of the plug connector. The locking sensor can possess a magnetic sensor, a pressure sensor, an optical sensor and/or a button or switch.

In a particularly advantageous configuration, the locking mechanism in its locked position prevents a disconnection of the plug-in connection and also its connection, i.e. the plug connector and the mating plug connector being plugged together, for example. This is particularly advantageous since the locking detector not only prevents a disconnection under load but in addition also a connection under load. In addition, the plug-in detector also advantageously prevents this, such that a double protection advantageously exists here which is required at specific safety levels (e.g. SIL 3). This increased safety owing to a plurality of measures applies of course to the plug-in process and also to the disconnection process as well as to the disconnected state.

For example, if it is pivoted into its locked position, i.e. closed, the locking clip can lock the plug-in connection in the plugged state. However, in the unplugged state, the closed locking clip can also prevent plugging, i.e. the plug connector cannot be plugged with the mating plug connector when the locking clip is closed. In this closed state, the locking clip can simultaneously cooperate with the sensor in such a way that a load (load current/load voltage) can be released as a result, i.e. can be switched to said at least one contact of the mating plug, for example. A load current can therefore flow when the plug-in connection is closed. When a plug-in connection is open, likewise no corresponding load voltage can be applied to the contact, since this is prevented by the plug-in detector. Furthermore, the plug connector cannot be plugged onto the mating plug connector anyway, i.e. closing the plug-in connection, due to the closed locking clip.

Neither disconnection nor plugging is therefore possible under load (load current/load voltage) for various reasons, which increases safety.

The invention is therefore particularly advantageous due to the fact that it prevents the plug-in connection from being disconnected and possibly also plugged under load in a particularly reliable manner. In particular, the invention is particularly advantageous for a particularly fast or jerky disconnection of the plug-in connection, consisting of the plug connector and the mating plug connector, for example pulling the plug connector out of a mating plug connector socket in a jerky manner, which mating plug connector socket forms the mating plug connector or at least is a part of the mating plug connector. In this case, it is particularly advantageous that there is always a sufficiently long period of time between unlocking and pulling as well as between plugging and locking.

In particular, it is particularly advantageous to spatially move the sensor system, i.e. the sensor and in particular also the detector, into the locking region, wherein in particular the sensor and in particular the sensor system which includes the sensor cooperates with the locking clip, for example at the mating plug connector housing, in particular at the attachment housing, in order to control the electrical disconnection device. Finally, this provides a sufficient time interval between the electrical disconnection (switch-off) and the ultimate disconnection of the plug-in connection, e.g. pulling out the plug connector, because the lock of the plug-in connection must be released before the disconnection process—e.g. pulling out the plug connector. A period of time therefore passes until the actual disconnection process which is sufficient in order to compensate for any mechanical inertia in the transmission path, in particular inertia of mechanical switches.

A further advantage of the invention compared to the prior art involves the plug-in system being compatible with normal plug-in systems insofar as the contact assignment of the plug connector (and therefore also the mating plug connector) can be selected in an arbitrary manner by the user, since contact is usually not required for transmitting a control voltage.

Contact locations are therefore only assigned in the insulating body if the plug-in detector cooperates with a contact bridge in the insulating body of the mating plug. In all other disclosed configurations of the plug-in detector, all contacts remain free and are available for normal plug-in application, despite the aforementioned increased safety.

In particular, the mating plug connector can possess a mating plug connector housing, in particular an attachment housing, on which the locking clip is pivotally held, for example on bearing pins provided for this purpose. The plug connector can possess a plug connector housing with latching pins. The locking clip, if pivoted in its position locking the plug-in connection, i.e. is in its closed state, can then engage around the latching pins of the mating plug housing in a locking manner and lock the plug connector housing with the mating plug connector housing and ideally press them against one another in a sealing manner. In this case, a pressure detector can also be provided at the housing edges as a mechanical contact detector.

In one advantageous configuration, the device can have an attachment housing on which the locking clip is pivotally held. This is particularly advantageous because the attachment housing can be attached to a wall breakthrough and/or a switch cabinet and/or an apparatus housing. This usually makes it clear already during installation from which plug connection side the supply voltage is emitted, which simplifies installation. Finally, it is particularly advantageous to arrange the at least one electrical disconnection device on the side of the plug-in connection on which the supply voltage is connected on the cable side, for example by means of one or a plurality of supply lines of a first cable. In particular, it can be advantageous to arrange the disconnection device in the attachment housing, since the plug-in connection therefore has the ability to independently disconnect the load from the contact.

In particular, the attachment housing can be part of a mating plug. The plug-in connection can then have a plug connector and the mating plug, wherein a further cable is preferably connected to the plug connector, in order to continue the electrical power in the direction of its destination via same in the plugged, locked and released state.

In a different preferred configuration, the electrical disconnection device can be arranged in the apparatus housing or preferably in the switch cabinet, at which the mating plug is arranged in particular with its attachment housing. This is in particular advantageous if the electrical power, which is to be interrupted by the electrical disconnection device and which thus supplies the mating plug with the supply voltage, is arranged in the apparatus housing or preferably the switch cabinet.

It is self-evident that the installation should advantageously be carried out by appropriately competent specialized personnel. When installing an electrical system, the electrical disconnection device can thus in principle be arranged on the side of the plug-in connection carrying the supply voltage, in order to prevent a disconnection and/or a plugging under load in a particularly simple and effective manner.

The electrical disconnection device can be coupled with the sensor and the detector. In particular, a sensor signal in connection with the detector signal can cause the electrical disconnection device to electrically disconnect.

The electrical disconnection device can possess a control unit and an actuator unit. If the actuator unit is arranged in the plug connector housing, it can be arranged, for example, on a circuit board, for example in the form of a semiconductor relay, for example a transistor, or an electromechanical relay.

The control unit can receive a corresponding signal from the sensor and from the detector, for example if the locking clip is closed, i.e. is in its state which is provided for locking the plug connector, and at the same time the plug connector is plugged with the mating plug.

Consequently, the control unit can send a corresponding control signal to the actuator unit which then causes the actuator unit to close at least one associated electrical disconnector, such as at least one switch and/or at least one relay and/or at least one contactor, for example, so that the load current can flow through at least one contact pair.

In a particularly advantageous configuration, the locking clip in its locked position prevents not only the connected plug-in connection from being disconnected but conversely it also prevents the disconnected plug-in connection from being connected. This is particularly advantageous because it therefore not only prevents a disconnection of the plug-in connection under load but also a connection of the plug-in connection under load in a simple and effective manner. In particular, on the one hand, it therefore prevents the plug connector from being disconnected from the mating plug connector ("pulled out") while the load current flows through the corresponding contact pair. On the other hand, it also prevents a plug-in connection from being established ("plugged") while the load voltage is applied between the contact and the mating contact. In addition, the plug-in detector (detector) offers a further protection.

Magnetic sensors, for example reed sensors; pressure sensors, for example strain gages (SG) or piezoceramic pressure sensors; optical sensors or buttons/limit switches can be used as sensors/sensor systems, for example. However, the sensors which can be used for this are of course not limited to this list.

A sensor system can preferably be used for determining the locked state. The sensor system can have a magnetic field sensor as well as a magnet.

The magnet can be arranged at the locking clip, in particular at an operating region of the locking clip. The magnetic field sensor can be arranged at the mating plug connector housing. As soon as the locking clip with the magnet attached thereto, i.e. with its operating region, for example, get close to the magnetic field sensor, which thus closes the locking clip, the magnetic field sensor generates a sensor signal which releases the load (load voltage/load current).

Conversely, the load can be switched off as follows by unlocking the plug-in connection.

A method for the load-free disconnection of a plug-in connection, in particular by means of the aforementioned device, having the following steps:

A.) transferring a locking element into its closed position for locking a closed plug-in connection;
B.) the locking element (3) cooperating with a locking sensor (42) and the closed plug-in connection simultaneously cooperating with a plug-in detector (6);
C.) signaling the plugged state of the plug-in connection and the closed position of the locking element to a control unit (51) by way of the locking sensor (42) and the plug-in detector (6) as well as logically linking this information by way of the control unit (51);
D.) releasing a load (load current/load voltage) by way of an actuator unit which is controlled by the control unit;
E.) unlocking the plug-in connection by transferring the locking clip from its locked position into its unlocked position; therefore automatically
F.) blocking the load by way of the actuator unit;
G.) disconnecting the plug-in connection in a load-free manner.

As already mentioned, the locking element can be the locking clip. The locking sensor can be the magnetic field sensor which in particular is a component of a sensor system, in particular of a magnetic sensor system. Alternatively or additionally, the locking sensor can possess a pressure sensor, for example a strain gage (SG), an optical sensor and/or a button or switch.

The plug-in detector can have a switch or a magnetic field sensor or a so-called radio frequency identification device ("RFID") or a contact bridge in the insulating body of the plug connector.

BRIEF DESCRIPTION OF THE DRAWINGS

One exemplary embodiment of the invention is depicted in the drawings and is explained in greater detail hereinafter. In the drawings.

The figures contain partially simplified, schematic depictions. Identical reference numbers are used in part for similar but optionally not identical elements. Different views of the same elements could be scaled differently.

DETAILED DESCRIPTION OF THE INVENTION

Figure 1:
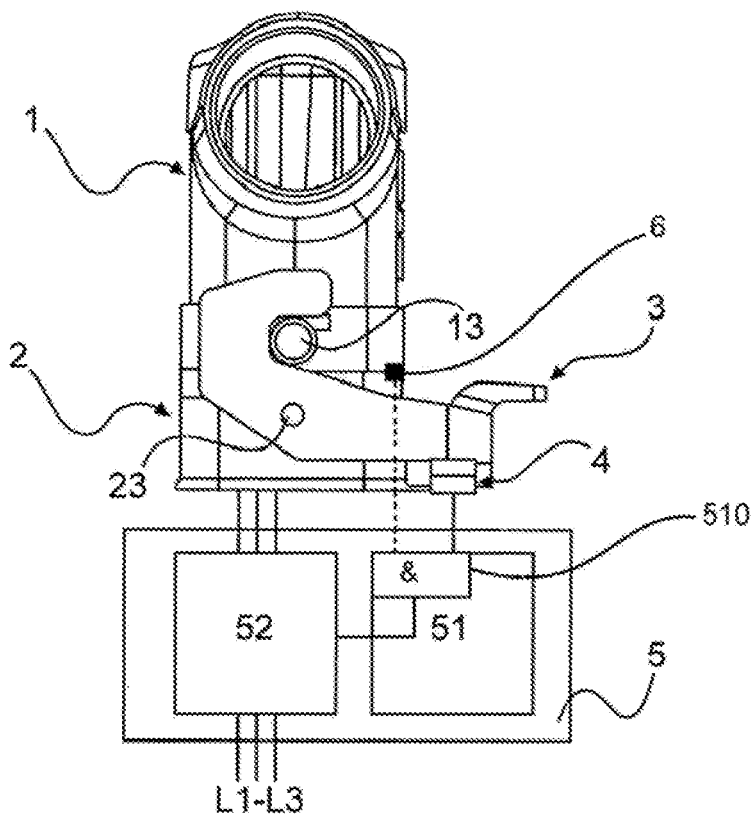
FIG. 1 shows a closed plug-in connection with a device for the load-free disconnection.
Figures 2A, 2B:
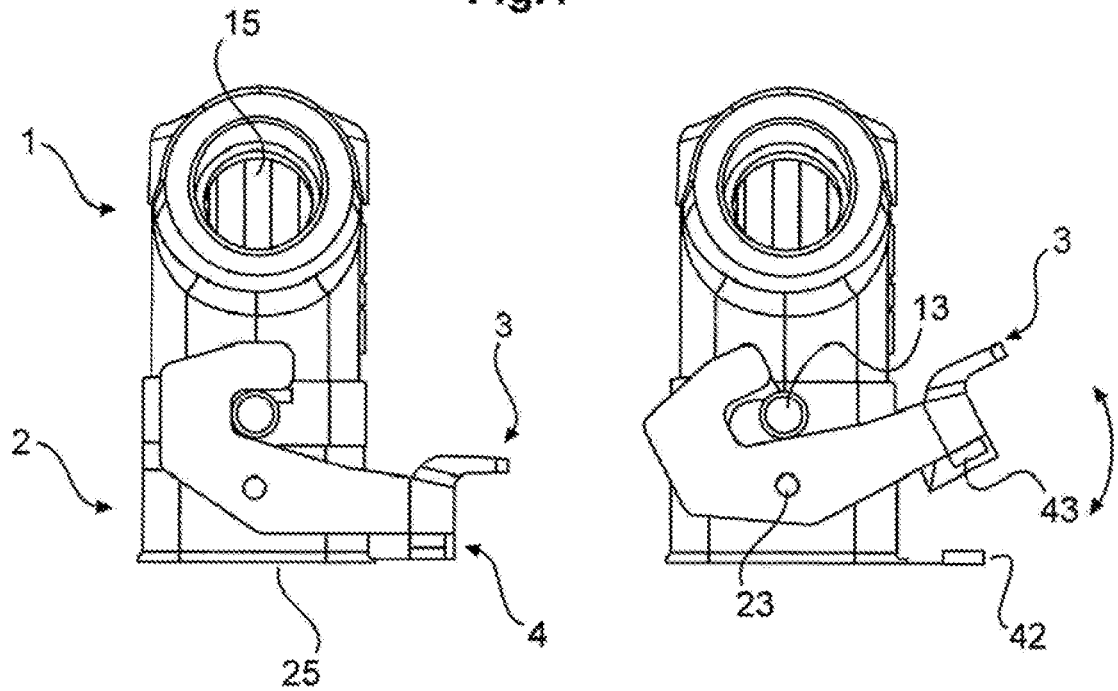
FIG. 2a shows the closed plug-in connection in the locked state.
FIG. 2b shows the closed plug-in connection in the unlocked state.

FIG. 1 and FIGS. 2a and 2b show a plug-in connection, having a plug connector housing 1 and a mating plug connector housing 2 which is designed as an attachment housing.

The plug connector housing 1 possesses a basic shape with a rectangular cross section and with rounded edges and possesses a respective cylindrical latching pin 13 at two narrow sides opposite one another, only one of which latching pins can be seen in the drawing. Moreover, the plug connector housing possesses a cable outlet 15.

The mating plug connector housing 2 likewise possesses a basic shape with a rectangular cross section and with rounded edges and possesses a respective cylindrical bearing pin 23 at two narrow sides opposite one another, on which bearing pin a locking clip 3 is pivotally held. A sensor system 4 is arranged between the locking clip 3 and a region of the mating plug connector 2 which is not described in more detail.

The sensor system 4 possesses a magnetic field sensor 42 described in FIG. 2b and a magnet 43. If the locking clip is closed and is thus located in its position locking the plug-in connection, as depicted in FIG. 1 and in FIG. 2a, this is detected by the sensor system 4. In the present case, this is achieved by the magnet 43 being located near to the magnetic field sensor 42. At the same time, the locking clip 3 engages around the latching pins 13 of the plug connector housing 1 with its free-standing end regions, of which only one is to be seen in the drawing. As a result, not only the closed plug-in connection is locked, but the plug connector housing 1 and the mating plug connector housing 2, which is also described as an attachment housing 2 hereinafter, are additionally pressed against one another in a sealing manner. In this case, a plug-in detector 6 is automatically actuated which is designed in the form of an electromechanical pressure detector. The output of the pressure detector 6 and also the output of the locking sensor 4 are supplied to a logical evaluation unit 510 of a control unit 51 of a disconnection device 5. Only when the locking sensor 4 is actuated and the pressure detector 6 is actuated at the same time are switches of an actuator unit 52 closed and a load current is released by the actuator unit 51 via the contacts of the mating plug 2 to the contacts of the plug 1.

The locking clip 3 is advantageously pivotally held on the bearing pin 23 of the attachment housing 2 in the form of a rocker switch. This has the advantage that the sensor 4 is actuated when the locking clip 3 is closed, i.e. the magnet 43 is arranged on the magnetic field sensor 42. Finally, in this design, the locking clip 3 can be pivoted into its locked position by its operating region, depicted on the right of the drawing, being pivoted in the direction of the attachment housing 2, i.e. downward in the drawing. At the same time, its free-standing ends are pivoted upward over the latching pins 13 of the plug connector housing 1.

FIG. 2b shows the locking clip 3 in its open position. It is clearly recognizable that the magnet 43 is disconnected from the magnetic field sensor 42. In this state, the magnetic field sensor 42 does not generate a sensor signal. At the same time, the pressure sensor 6, which is mentioned but not visible in this depiction, is still actuated. However, the logical evaluation unit 510 disconnects the electrical load voltage from the contacts of the mating plug by means of the actuator unit 52.

In contrast, when the locking clip 3 is closed, as shown in FIG. 1 and in FIG. 2a, the plug-in connection is locked and the sensor system 4 is simultaneously actuated. The sensor system 4 thus generates a sensor signal and it is transmitted from the magnetic field sensor 42 to the disconnection device 5, namely to the control unit 51 of the disconnection device 5, via a signal line, which is not provided with a reference number for reasons of clarity. At the same time, a detector signal is transmitted from the pressure detector 6 to the control unit via a detector line which is depicted as dashed lines. Both signals are evaluated in the logical evaluation unit 510 with a logical "AND" link. The control unit 51 then transmits a control signal to the actuator unit 52. The actuator unit 52, which is configured according to requirements, then switches through the supply lines L1-L3 of a first cable, which are guided into a connection opening 25 of the connection housing, and thus the load, i.e. the load voltage/supply voltage and thus the load current/supply current in operation.

The supply current can thus be transmitted via corresponding contact pairs which are not shown in the drawings. The contact pairs are part of the plug-in connection and consist of contacts on the plug connector side and mating contacts on the mating plug connector side which are plugged therewith, i.e. connected in a mechanically and electrically conductive manner. On the cable connection side, a further cable with corresponding further lines can be connected to the contacts on the plug connector side, in order to continue the electrical power in the direction of its destination via same in the plugged, locked and released state. The plug connector housing 1 possesses a cable outlet for running the cable out of the plug connector housing 1.

Since the plug connector housing 1 cannot be disconnected from the mating plug connector housing/attachment housing 2 when the locking clip 3 is closed, the plug-in connection cannot be disconnected under the applied load. In particular, it therefore cannot be disconnected so quickly that an electric arc occurs. Furthermore, a voltage cannot be applied to the contacts of the mating plug 2 in the disconnected state of the plug-in connection, since the pressure sensor 6 is not actuated in the disconnected state, even if the locking clip (3) is closed and the locking sensor 4 is therefore actuated.

Conversely, it is also easy to understand that a disconnected plug-in connection cannot be plugged either when the locking clip 3 is closed. This also prevents a plugging under load.

It is clear to the person skilled in the art—unless otherwise specified—that the combinations depicted and discussed are not the only possible combinations, even if different aspects or features of the invention are in each case shown in combination in the figures. In particular, mutually corresponding units or feature complexes from different exemplary Device and Method for the Load-Free Disconnection of a Plug-In Connection List of Reference Numbers 1 plug connector housing
13 latching pin
15 cable outlet
2 mating plug connector housing/attachment housing
23 bearing pin
25 connection opening
3 locking clip
4 sensor system
42 sensor, locking sensor, magnetic field sensor
43 magnet
5 disconnection device
51 control unit
510 logical evaluation unit
52 actuator unit
6 plug-in detector
L1-L3 supply lines

The invention claimed is:

1. A device for the load-free disconnection of a plug-in connection, wherein the device has at least one electrical disconnection device and a locking device,
    wherein the locking device is configured to assume a position locking the plug-in connection and also in a position unlocking the plug-in connection,
    wherein the device further possesses a sensor which cooperates with the locking device, in order to control the electrical disconnection device, whereby the sensor is a locking sensor,
    wherein the locking mechanism in its locked position prevents a disconnection and also a connection of the plug-in connection,
    wherein the locking device is a locking clip which is configured to be pivoted into said locked, i.e. closed, position and also into said unlocked, i.e. open, position,
    wherein the device includes the plug-in connection and that the plug-in connection includes a plug connector and a mating plug connector, Wherein the plug connector has a plug connector housing with latching pins and wherein the mating plug connector has a mating plug connector housing with bearing pins on which the locking clip is pivotally held, in order to engage around the latching pins of the plug connector housing in its position locking the plug-in connection,
    wherein the device further includes a plug-in detector configured for determining a plug-in state of the plug-in connection, wherein the plug-in detector and the locking sensor are configured to control the electrical disconnection device together, and wherein the electrical disconnection device possesses a control unit and an actuator unit, and that the plug-in detector and also the locking sensor are connected to the outside of the control unit.

2. The device as claimed in claim 1, wherein the control unit possesses a logical evaluation unit which is configured,
    to either link together a plug-in signal of the plug-in detector when the plug connector is plugged in and a locking signal of the locking detector when the locking clip is locked, in order to thus cause the actuator unit to transmit a load current,
    or to cause the actuator unit to block the load current when the plug connectors not plugged in and/or the locking clip is not closed.

3. The device as claimed in claim 1, wherein the plug-in detector has a switch or a magnetic field sensor or a radio frequency identification device ("RFID") or a contact bridge in the insulating body of the plug connector and wherein the locking sensor possesses a magnetic sensor, a pressure sensor, an optical sensor and/or a button or switch.

4. The device as claimed in claim 3, wherein the mating plug connector housing is configured as an attachment housing.

5. The device as claimed in claim 3, wherein the electrical disconnection device is arranged in the mating plug connector housing.

6. The device as claimed in claim 4, wherein the attachment housing is arranged at a switch cabinet or a housing of an electrical apparatus, and that the electrical disconnection device is arranged in the switch cabinet or in the housing of the electrical apparatus.

7. The device as claimed in claim 2, wherein the plug-in detector has a switch or a magnetic field sensor or a so-called radio frequency identification device ("RFID") or a contact bridge in the insulating body of the plug connector and wherein the locking sensor possesses a magnetic sensor, a pressure sensor, an optical sensor and/or a button or switch.

8. The device as claimed in 7, wherein the mating plug connector housing is configured as an attachment housing.

9. The device as claimed in claim 7, wherein the electrical disconnection device is arranged in the mating plug connector housing.

10. The device as claimed in claim 7, wherein the attachment housing is arranged at a switch cabinet or a housing of an electrical apparatus, and that the electrical disconnection device is arranged in the switch cabinet or in the housing of the electrical apparatus.

11. A method for the load-free disconnection of a plug-in connection, having the following steps:
- A.) transferring a locking element into its closed position for locking a closed plug-in connection;
- B.) the locking element cooperating with a locking sensor and the closed plug-in connection simultaneously cooperating with a plug-in detector;
- C.) signaling the plugged state of the plug-in connection and the closed position of the locking element to a control unit by way of the locking sensor and the plug-in detector as well as logically linking this information by way of the control unit;
- D.) releasing a load (load current/load voltage) by way of an actuator unit which is controlled by the control unit;
- E.) unlocking the plug-in connection by transferring the locking element from its locked position into its unlocked position; therefore automatically
- F.) blocking the load by way of the actuator unit;
- G.) disconnecting the plug-in connection in a load-free manner.

12. The method as claimed in claim 11, wherein the locking element is designed as a locking clip.

13. The method as claimed in claim 11, wherein the plug-in detector has a switch or a magnetic field sensor or a so-called radio frequency identification device ("RFID") or a contact bridge in the insulating body of the plug connector and wherein the locking sensor possesses a magnetic sensor, a pressure sensor, an optical sensor and/or a button or switch.

14. The method as claimed in claim 12, wherein the plug-in detector has a switch or a magnetic field sensor or a so-called radio frequency identification device ("RFID") or a contact bridge in the insulating body of the plug connector and wherein the locking sensor possesses a magnetic sensor, a pressure sensor, an optical sensor and/or a button or switch.

* * * * *